(No Model.)
J. W. CLARKE.
MACHINE FOR SPRINKLING FLUID POISON.
No. 345,413. Patented July 13, 1886.
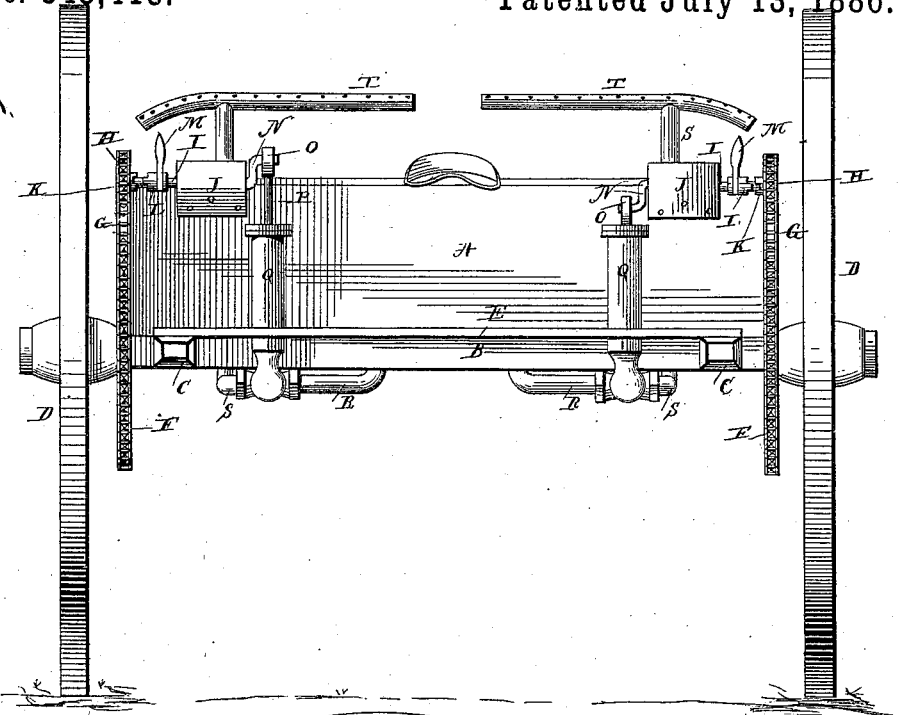
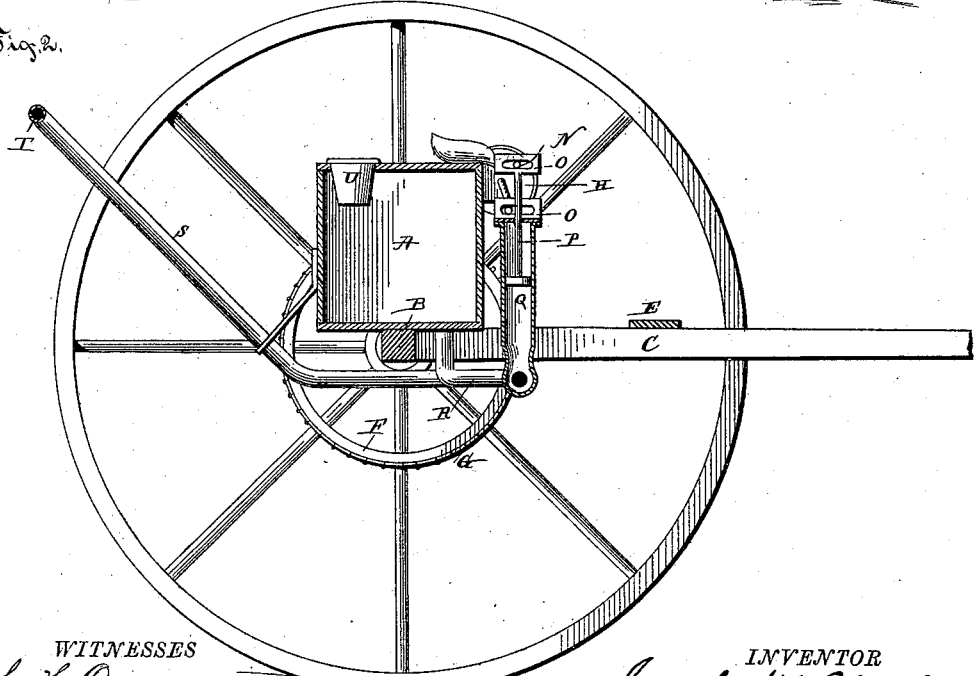
WITNESSES
INVENTOR
Joseph W. Clarke
By Louis Bagger & Co.
Attorney

UNITED STATES PATENT OFFICE.

JOSEPH W. CLARKE, OF NEWNAN, GEORGIA, ASSIGNOR OF ONE-THIRD TO NATHANIEL B. GLOVER, OF SAME PLACE.

MACHINE FOR SPRINKLING FLUID POISON.

SPECIFICATION forming part of Letters Patent No. 345,413, dated July 13, 1886.

Application filed March 20, 1886. Serial No. 195,914. (No model.)

*To all whom it may concern:*

Be it known that I, JOSEPH W. CLARKE, a citizen of the United States, and a resident of Newnan, in the county of Coweta and State of Georgia, have invented certain new and useful Improvements in Machines for Sprinkling Fluid Poison; and I do hereby declare that the following is a full, clear, and exact description thereof, which will enable others skilled in the art to which it appertains to make and use the same, reference being had to the accompanying drawings, which form a part of this specification, and in which—

Figure 1 is a front view of my improved machine for sprinkling fluid poison, showing the shafts broken away; and Fig. 2 is a vertical sectional view on line $x\,x$, Fig. 1.

Similar letters of reference indicate corresponding parts in both the figures.

My invention has relation to machines for sprinkling fluid poison over plants for the purpose of destroying insects and worms, which injure the plants, being especially intended for the destruction of cotton-worms; and it consists in the improved construction and combination of parts of a machine in which two pumps are operated by the wheels for forcing fluid poison from a tank into spray-pipes, as hereinafter more fully described and claimed.

In the accompanying drawings, the letter A indicates a tank, which is secured upon an axle, B, having forwardly-projecting thills C C, and provided with wheels D D, journaled upon the ends of the axle. A foot-board, E, connects the inner portions of the thills and serves as a support for the feet of the driver, whose seat will be on the top of the tank. The hubs of the wheels are provided with large sprocket-wheels F F, over which pass chains G G, which pass over sprocket-wheels H H at the outer ends of shafts I I, journaled at the forward upper edge of the tank, in bearings J J. The sprocket-wheels revolve freely upon the ends of the shafts, and the inner faces of the hubs of the sprocket-wheels are formed with half-clutches K, which may be engaged by clutch-sleeves L L, which slide upon and turn with the shafts, having levers M M, engaging them and shifting them when tilted. The inner ends of the shafts are provided with cranks N, which engage the slotted cross-heads O upon the pistons P of the pumps Q, and it will be seen that when the shafts are revolved the cranks will reciprocate the pistons. The pumps have inlet-tubes R R, which enter the tank at its bottom, and outlet-tubes S S, which project upward and rearward in an inclined position, and which are provided at the upper ends with transverse curved perforated spray-pipes T T, which may distribute the fluid in a sheet of spray when the fluid is forced into them by the pumps. The top of the tank is provided with a funnel-shaped strainer, U, through which the water used for dissolving or diluting the poison may be strained. It will be seen that each pump acts independently of the other, and that one pump may be thrown out of gear and remain inactive while the other is at work, when the machine will only throw spray to one side, and when the machine is transported from one place to another the sprocket-wheels may both be thrown out of engagement with the clutch-sleeves, when they may revolve freely upon the shafts without affecting the pumps.

This machine is chiefly intended to throw the spray obliquely upward, so as to allow the spray to fall from above upon larger plants—as, for example, cotton-plants; but it follows that, although the machine is principally intended for the purpose of destroying cotton-worms, the spray-pipes may be set at any angle, so as to direct the spray directly upon smaller plants or in any desired direction.

I am aware that it is not new to sprinkle fluid upon plants by means of a sprinkling apparatus supplied with a set of pumps and spray-pipes, and I do not claim such construction, broadly; but

I claim, and desire to secure by Letters Patent of the United States—

A wheeled sprinkler having two distinct and separate spray-pipes, two pumps connected, respectively, one to each of said pipes and to the common tank, two shafts, one journaled near each end of the tank, each shaft having a crank at one end and a clutch-pinion at the other, said clutch pinions receiving their motion from the wheels of the sprinkler, and a clutch-sleeve and actuating-lever located upon each of said shafts, for causing both pumps to operate at the same time or individually, substantially as described and set forth.

In testimony that I claim the foregoing as my own I have hereunto affixed my signature in presence of two witnesses.

JOSEPH W. CLARKE.

Witnesses:
WILLIAM STALLINGS,
ORLANDO MCCLENDON.